United States Patent [19]

Hen

[11] Patent Number: 5,008,025
[45] Date of Patent: Apr. 16, 1991

[54] SULFONATE-CONTAINING POLYMER/POLYANIONIC CELLULOSE COMBINATION FOR HIGH TEMPERATURE/HIGH PRESSURE FILTRATION CONTROL IN WATER BASE DRILLING FLUIDS

[75] Inventor: John Hen, Skillman, N.J.
[73] Assignee: Mobil Oil Corporation, Fairfax, Va.
[21] Appl. No.: 437,419
[22] Filed: Nov. 16, 1989
[51] Int. Cl.$^5$ ............................................. C09K 7/02
[52] U.S. Cl. .................. 252/8.51; 252/8.512; 252/8.513; 252/8.514
[58] Field of Search ................ 252/8.51, 8.512, 8.513, 252/8.514

[56] References Cited

U.S. PATENT DOCUMENTS

| | | | |
|---|---|---|---|
| 2,570,947 | 11/1945 | Himel et al. | 252/8.51 |
| 2,650,905 | 3/1950 | Fordyce et al. | 252/8.51 |
| 2,718,497 | 11/1950 | Oldham et al. | 252/8.5 |
| 2,776,259 | 9/1955 | Salathiel | 252/8.511 |
| 3,123,366 | 10/1978 | Sauber et al. | 252/8.511 |
| 3,993,133 | 11/1976 | Clampitt | 166/272 |
| 4,290,899 | 9/1981 | Malone et al. | 252/8.511 |
| 4,369,843 | 1/1983 | Mondshine | 166/292 |
| 4,440,649 | 4/1984 | Loftin et al. | 252/8.51 |
| 4,462,837 | 7/1984 | Baker et al. | 106/93 X |
| 4,500,436 | 2/1985 | Pabley | 252/8.511 |
| 4,502,965 | 3/1985 | Giddings et al. | 252/8.51 |
| 4,518,510 | 5/1985 | Gleason et al. | 252/8.51 |
| 4,547,299 | 10/1985 | Lucas | 252/8.51 |
| 4,554,307 | 11/1985 | Farrar et al. | 524/425 X |
| 4,626,362 | 12/1986 | Dickert, Jr. et al. | 252/8.51 |
| 4,629,573 | 12/1986 | Raines | 252/8.51 |
| 4,629,575 | 12/1986 | Weibel | 252/8.551 |
| 4,631,137 | 12/1986 | Dymond | 252/8.514 |
| 4,652,623 | 3/1987 | Chen et al. | 526/287 X |
| 4,664,818 | 5/1987 | Halliday et al. | 252/8.511 |
| 4,674,574 | 6/1987 | Savoly et al. | 166/293 |
| 4,699,225 | 10/1987 | Bardolinalla | 175/72 X |
| 4,728,445 | 3/1988 | Hale | 252/8.514 |
| 4,741,843 | 5/1988 | Garvey et al. | 252/8.514 |
| 4,836,940 | 6/1989 | Alexander | 252/8.512 |

*Primary Examiner*—Robert L. Stoll
*Assistant Examiner*—Chhaya Sayala
*Attorney, Agent, or Firm*—Alexander J. McKillop; Charles J. Speciale; Charles A. Malone

[57] ABSTRACT

A method and composition for improving high temperature and high pressure filtration control in a water base drilling fluid is described. Polyanionic cellulose is combined with a synthetic sulfonate containing vinyl polymer into a drilling fluid to provide for unexpectedly improved filtration control.

25 Claims, No Drawings

SULFONATE-CONTAINING POLYMER/POLYANIONIC CELLULOSE COMBINATION FOR HIGH TEMPERATURE/HIGH PRESSURE FILTRATION CONTROL IN WATER BASE DRILLING FLUIDS

FIELD OF THE INVENTION

This invention relates to a method for drilling a well, and more particularly, to a water-based drilling fluid additive which provides improved filtration control and thermal stability.

BACKGROUND OF THE INVENTION

In the course of drilling oil and gas wells and the like by means of a rotary well drilling apparatus, drilling fluid or drilling mud is pumped down through a rotary drill pipe and discharged at or adjacent the bit at the lower end thereof. In normal drilling operations, a portion of this circulation fluid returns upward through the well bore and is conducted to a sump where it is filtered and returned to the pump and again pumped down the drill pipe.

The primary functions of the drilling fluid or drilling mud are: (1) to lubricate and cool the drilling bit; (2) to suspend the cuttings from the drilling operations so that they are carried to the surface and removed; (3) to prevent excessive amounts of fluids from flowing from the well bore into surrounding formations by depositing on the wall of the hole a thin, but substantial, impervious filter cake; (4) to serve as a weighting material exerting sufficient pressure to counterbalance any pressure exerted by water, gas, oil, or other earth fluid, and (5) to prevent caving or other intrusions into the drill hole.

Thus, an efficient drilling mud must exhibit numerous characteristics, including, for example, viscosity, initial and 10-minute gel strength, thixotropy, fluid loss prevention, stability under various temperature and pressure operating conditions, stability against contaminating fluids, such as salt water, calcium sulfate, cement and potassium ion contaminated fluids, etc.

Aqueous clay-based drilling fluids or muds are well-known in the prior art, as are different additives. Such fluids are comprised basically of water, a clay such as bentonite or sepiolite, lignosulfonate, a base such as NaOH, a densifier such as barite or barium sulfate, and possibly a salt containing a cation such as sodium or potassium. Other aqueous ionic compounds such as $Na^+Cl^-$ may also be present. These fluids are suitable for drilling at pH levels from about 8 to about 11.5.

Oil-producing formations are generally porous layers having varying degrees of permeability to the flow of fluids such as oil, water, or gas. Consequently, the rate of oil production is largely determined by the rate of flow through these permeable formations which, in turn, is dependent upon the porosity or permeability of the sand or stone present. In drilling through such a porous layer, it is desirable to employ a drilling fluid having such characteristics that excessive amounts of liquids or solids are prevented from penetrating through the porous formation. The ability of the drilling fluid to prevent excessive formation fluid penetration is called filtration control.

Materials that have been used in the past to control filtration rates of aqueous drilling fluids by plugging, producing cakes, or similar methods, have included materials such as pregelatinized starch, sodium carboxymethylcellulose, sodium polyacrylates, and lignites. Each of these materials have certain limitations. For example, lignite becomes ineffective in high salt concentrations. A drilling fluid containing a copolymer filtration agent is disclosed in U.S. Pat. No. 4,547,299 which issued to Lucas on Oct. 15, 1985. Additive systems for controlling fluid loss in aqueous drilling fluids at high temperatures are discussed in U.S. Pat. No. 4,626,362 which issued to Dickert et al. on Dec. 2, 1986.

In drilling deep wells, bottom-hole temperatures over 300° F. are often encountered which cause many conventional drilling fluid additives to thermally degrade. As additives degrade, essential drilling fluid properties, such as filtration control and rheology, also deteriorate. Continual addition of fresh additives to maintain fluid properties can be costly.

Therefore, what is needed is fluid loss additive for a water-based drilling fluid which improves filtration control and which remains stable for extended periods at deep well drilling temperatures.

SUMMARY OF THE INVENTION

This invention is directed to a method and composition for improving filtration control and thermal stability of a water-based drilling fluid for extended periods at deep well drilling temperatures. The method comprises placing an additive into said drilling fluid which additive contains polyanionic cellulose and a critical molecular weight range of a synthetic sulfonate-containing polymer. When the sulfonate-containing polymer is added into a drilling fluid containing polyanionic cellulose, it unexpectedly and substantially reduces filter loss. Substantially improved filter loss is obtained when polyanionic cellulose and the sulfonate containing polymer, having a molecular weight of about 300,000 to about 10 million, are combined in a water-based drilling mud after prolonged aging at about 300° F.

A sulfonate-containing polymer is defined as any vinyl polymer or copolymer in which one of the components is based on a sulfonic acid monomer or where the sulfonate is derived by sulfonating an existing vinyl polymer or copolymer. The aforementioned vinyl polymer or copolymer is generally prepared by free-radical polymerization methods and is specifically differentiated from those derived from condensation polymerization. Examples of sulfonic acid monomers are: ethylenesulfonic acid, propenesulfonic acid, methylpropenesulfonic acid, styrenesulfonic acid, vinyltoluenesulfonic acid, sulfoethyl methacrylate, and 2-acrylamido-2-methylpropanesulfonic acid "AMPS" ®. A sulfonate-containing polymer can also be obtained by sulfonating polystyrene or a styrene copolymer. These polymers are generally stable to at least 400° F., particularly those containing AMPS monomer.

Therefore, an object of this invention is to provide a drilling fluid having improved fluid additive filtration control at high temperature and high pressure operating conditions.

Another object of this invention is to produce a drilling fluid additive which has improved thermal stability at deep well drilling depths.

It is yet another object of this invention to provide for a drilling fluid additive which reduces high temperature and high pressure fluid loss.

It is still another object of this invention to utilize a fluid additive combination having two materials which provides for optimum filtration control, cost, and rheological properties by using a lower concentration of the more expensive sulfonate-containing polymer and a higher concentration of the less expensive polyanionic cellulose.

It is a yet still further object of this invention to provide for a water-based drilling fluid additive which is effective in concentrated brines.

It is a still yet further object of this invention to provide for a water-based drilling fluid additive which is effective in muds in which bentonite concentration is kept low to increase the rate of penetration.

It is an even yet further object of this invention to provide for a water-based drilling fluid additive which can tolerate substantial levels of incorporated drill solids.

DESCRIPTION OF THE PREFERRED EMBODIMENTS

The present invention is directed to an aqueous drilling fluid additive which combines a sulfonate containing vinyl-polymer with a polyanionic cellulose compound or carboxymethyl cellulose to obtain an unexpectedly improved filtration control in a drilling mud. The drilling mud commonly used is an aqueous clay-based drilling fluid or mud. It is comprised basically of water, a clay such as bentonite or sepiolite, lignosulfate, a base such as NaOH, a densifier such as barite or barium sulfate, and possibly a salt containing a cation such as sodium or potassium. Other aqeuous ionic compounds such as $Na^+Cl^-$ may also be present. This mud is suitable for drilling at pH levels from about 8 to about 11.5.

The combined additives impart high temperature stability and high pressure, and high temperature filtration control characteristics to an aqueous drilling mud. The sulfonate containing vinyl polymer has a molecular weight of about 300,000 to about 10 million. When said polymer and polyanionic cellulose are combined with a water based drilling fluid, filtration control after prolonged aging at 300° F. is significantly and unexpectedly improved.

Polyanionic cellulose or carboxymethyl cellulose (CMC) are commonly used filtration control agents at temperatures below 300° F. CMC can be purchased from Drilling Specialties and is sold under the DRISCOSE trademark. CMC is discussed in U.S. Pat. No. 4,290,899 which issued to Malone et al. on Sept. 22, 1981. This patent is incorporated by reference herein. Other hydroxyalkyl celluloses and alkyl ether substituted celluloses are disclosed in U.S. Pat. No. 4,629,575 which issued to Weibel on December 16, 1986. This patent is hereby incorporated by reference herein.

Polyanionic cellulose is a filtration control additive for water based drilling fluids. This additive degrades significantly as temperature approaches 300° F. DRISPAC polyanionic cellulose, a trademarked product of Drilling Specialties Company of Bartlesville, Okla., can be used as a source for the purchase of this polymer.

The sulfonate-containing polymer of interest in this invention is defined as any vinyl polymer or copolymer in which one of the components is based on a sulfonic acid monomer or where the sulfonate is derived by sulfonating an existing vinyl polymer or copolymer. Examples of sulfonic acid monomers are: ethylenesulfonic acid, propenesulfonic acid, methylpropenesulfonic acid, styrenesulfonic acid, vinyltoluenesulfonic acid, sulfoethyl methacrylate, 2-acrylamido-2-methylpropanesulfonic acid "AMPS". A sulfonate-containing polymer can also be obtained by sulfonating polystyrene or a styrene copolymer. The aforementioned vinyl polymers or copolymers are generally prepared by free-radical polymerization methods and are specifically differentiated from those derived via condensation polymerization techniques. These polymers are generally stable to at least 400° F., particularly those containing the AMPS ® monomer. AMPS is a trademark of the Lubrizol Corporation. The sulfonate-containing vinyl polymer or copolymer is defined as having a molecular weight of about 300,000 to about 10 million.

The following examples demonstrate the unexpected effect obtained when CMC or a polyanionic cellulose were combined with a selected sulfonated polymer. The components provide optimum filtration control, rheology, and cost benefits by using a lower concentration of the more expensive sulfonate-containing polymer and a higher concentration of the less expensive polyanionic cellulose.

EXAMPLE 1

Low viscosity (i.e., low molecular weight) polyanionic cellulose was added at a concentration of 6.5 ppb (pounds per barrel) to a 10-ppg (pounds per gallon) base mud containing 22% sodium chloride, 4.8 ppb bentonite, 0.5 ppb lignosulfonate, 0.12 ppb sodium hydroxide, and 1 ppb of XC viscosifier polymer. The system was aged, with rolling, for 16 hours at 300° F. The mud was filtered in a Baroid high temperature/high pressure filtration apparatus for 30 minutes at 300° F. and 500 psi. The filter loss was 58 cc.

EXAMPLE 2

Driscal TM is a high temperature filtration control polymer of Drilling Specialties. It is a high molecular weight (1–10 million) copolymer containing AMPS ® and acrylamide. 100% active Driscal polymer was added at a concentration of 6.5 ppb to the base mud described above. The system was aged, with rolling, for 16 hours at 300° F. and filtered as described above for 30 minutes at 300° F. and 500 psi. The filter loss was 16 cc.

EXAMPLE 3

5 ppb polyanionic cellulose and 1.5 ppb of 100% active Driscal were added to the base mud described above. The mud was aged, with rolling, for 16 hours at 300° F. and filtered as described above for 30 minutes at 300° F. and 500 psi. The expected filter loss based on the results of Examples 1 and 2 is 48 cc. The actual filter loss obtained was 18 cc. This demonstrates the unexpected improvement in filtration control obtained by combining polyanionic cellulose and the sulfonate-containing vinyl polymer.

EXAMPLE 4

1.5 ppb of 100% active Driscal was added to the base mud described above. The mud was aged, with rolling, for 16 hours at 300° F. and filtered as described above for 30 minutes at 300° F. and 500 psi. The filter loss was 45 cc. This further demonstrates that the unexpected low filter loss obtained with the polyanionic cellulose and sulfonate-containing polymer cannot be attributed to the sulfonate-containing polymer alone.

EXAMPLE 5

Driscal TM, the sulfonate-containing high polymer in Example 2, was replaced by Hoechst HOE 2825 and HOE 3118. Hoechst HOE 2825 and HOE 3118 are copolymers of about 1 million molecular weight which contain AMPS and N-methyl-N-vinylacetamide. In addition, HOE 2825 contains acrylamide. These copolymers are products of the Hoechst Corp. and are discussed in U.S. Pat. No. 4,626,362 which is incorporated by reference herein. A concentration of 6.5 ppb was added to the base mud separately. The thus-formulated muds were processed in exactly the same manner as in Example 2. The filter loss was 17 and 14 cc respectively for the drilling muds containing HOE 2825 and HOE 3118, respectively.

EXAMPLE 6

5 ppb low viscosity polyanionic cellulose and 1.5 ppb HOE 2825 were added to the base mud described above, aged with rolling for 16 hours at 300° F., and filtered 30 minutes at 300° F. and 500 psi. The expected filter loss based on the results of Example 1 and Example 4 is 48 cc. Again, the actual filter loss was unexpectedly low at 18 cc. 5 ppb low viscosity polyanionic cellulose and 1.5 ppb HOE 3118 were added to the base mud described above, aged with rolling for 16 hours at 300° F., and filtered 30 minutes at 300° F. and 500 psi. The filter loss was again surprisingly low at 16 cc compared to an expected 48 cc based on results of Examples 1 and 4.

As shown above, combinations of synthetic sulfonate-containing filtration control polymer and polyanionic cellulose act unexpectedly to provide better filtration control than either material alone at temperatures about 300° F. These combinations are effective in concentrated brines, which may be encountered in salt formations, native waters, or seawater muds, or which may be purposely added to control shales or gas hydrates, or to densify without added solids. Said combination makes an additive which is effective in muds where the bentonite concentration is kept low to increase penetration. This additive also tolerates substantial levels of incorporated drill solids. Rheology can be adequately controlled by addition of a viscosifier, such as XC polymer. XC polymer is discussed in U.S. Pat. No. 4,629,575 supra. Alternatively, the rheology can also be controlled by increasing the bentonite content slightly.

Obviously, many other variations and modifications of this invention as previously set forth may be made without departing from the spirit and scope of this invention as those skilled in the art readily understand. Such variations and modifications are considered part of this invention and within the purview and scope of the appended claims.

What is claimed is:

1. A method for improving filtration control of a water based drilling fluid via addition of a drilling fluid additive comprising:
   (a) adding to said fluid a drilling fluid additive which comprises about 0.25 lbs/bbl. to about 10 lbs/bbl. of a hydroxyalkyl cellulose or an alkyl ether substituted cellulose and
   (b) adding to said fluid about 0.25 to about 10 lbs/bbl. of a synthetic sulfonate containing vinyl polymer having a molecular weight range of about 300,000 to about 10 million wherein the weight ratio of component (a) to said polymer is about 10:1 to about 1:1 which results in a drilling fluid additive having filtration control qualities substantially equal to those expected for said synthetic sulfonate containing vinyl polymer alone.

2. The method as recited in claim 1 where said cellulose comprises a polyanionic cellulose or carboxymethyl cellulose.

3. The method as recited in claim 1 where in step (b) said synthetic polymer comprises a vinyl polymer or copolymer in which one of the components is based on a sulfonic acid monomer or where the sulfonate is derived by sulfonating an existing vinyl polymer or copolymer.

4. A method for improving filtration control of a water based drilling fluid via addition of a drilling fluid additive comprising:
   (a) adding to said fluid a drilling fluid additive comprising about 0.25 lbs/bbl. to about 10 lbs/bbl. of a polyanionic cellulose or carboxymethyl cellulose; and
   (b) adding to said fluid about 0.25 to about 10 lbs/bbl. of a synthetic sulfonate containing polymer which has a molecular weight range of about 300,000 to about 10 million which polymer comprises a vinyl polymer or copolymer in which one of the components is based on a sulfonic acid monomer or where the sulfonate is derived by sulfonating an existing vinyl polymer or copolymer wherein the weight ratio of polyanionic cellulose or carboxymethylcellulose to sulfonate-containing polymer is about 10:1 to about 1:1 which results in a drilling fluid additive having filtration control qualities substantially equal to those expected for said synthetic sulfonate containing vinyl polymer alone.

5. The method as recited in claim 4 where in step (b) said sulfonic acid monomer is selected from a member of the group consisting of ethylenesulfonic acid, propenesulfonic acid, methylpropenesulfonic acid, styrenesulfonic acid, vinyltoluene-sulfonic acid, sulfoethyl methacrylate; 2-acrylamido-2-methylpropanesulfonic acid, and mixtures thereof.

6. The method as recited in claim 4 where in step (b) said sulfonate polymer is obtained by sulfonating polystyrene or a styrene copolymer.

7. The method as recited in claim 4 where in step (b) about 5 ppb of polyanionic cellulose is combined with about 1.5 ppb of a sulfonate polymer containing 2-acrylamido-2-methylpropanesulfonic acid and N-methyl-N-vinylacetamide.

8. The method as recited in claim 4 where in step (b) about 5 ppb of polyanionic cellulose is combined with about 1.5 ppb of a sulfonate polymer containing 2-acrylamido-2-methylpropanesulfonic acid, N-methyl-N-vinylacetamide and acrylamide.

9. The method as recited in claim 4 where in step (b) about 5 ppb of polyanionic cellulose is combined with about 1.5 ppb of a sulfonate polymer containing 2-acrylamido-2-methylpropanesulfonic acid and acrylamide.

10. The method as recited in claim 4 where the water based drilling fluid is a concentrated brine.

11. A composition for improving filtration control of a water based drilling fluid comprising:
   (a) a polyanionic cellulose or carboxymethyl cellulose in an amount of about 0.25 to about 10 lbs/bbl.; and
   (b) a synthetic sulfonate containing polymer in an amount of about 0.25 to about 10 lbs/bbl. that has a molecular weight range of about 300,000 to about 10 million wherein the weight ratio of component (a) to said polymer is about 10:1 to about 1:1 which polymer comprises a vinyl polymer or copolymer in which one of the components is based on a sulfonic acid monomer or where the sulfonate is derived by sulfonating an existing vinyl polymer or copolymer which results in a drilling fluid additive having filtration control qualities substantially equal to those expected for said synthetic sulfonate containing polymer alone.

12. The composition as recited in claim 11 where in step (b) said sulfonic acid monomer is selected from a member of the group consisting of ethylenesulfonic acid, propenesulfonic acid, methylpropenesulfonic acid, styrenesulfonic acid, vinyltoluenesulfonic acid, sulfoethyl methacrylate; 2-acrylamido-2-methylpropanesulfonic acid, and mixtures thereof.

13. The composition as recited in claim 11 where in step (b) said sulfonate polymer is obtained by sulfonating polystyrene or a styrene copolymer.

14. The method as recited in claim 11 where in step (b) 5 ppb of polyanionic cellulose is combined with 1.5 ppb of a sulfonate polymer containing 2-acrylamido-2-methylpropanesulfonic acid and N-methyl-N-vinylacetamide.

15. The method as recited in claim 11 where in step (b) 5 ppb of polyanionic cellulose is combined with 1.5 ppb of a sulfonate polymer containing 2-acrylamido-2-methylpropanesulfonic acid, N-methyl-N-vinylacetamide and acrylamide.

16. The method as recited in claim 11 where in step (b) 5 ppb of polyanionic cellulose is combined with 1.5 ppb of a sulfonate polymer containing 2-acrylamido-2-methyl-propanesulfonic acid and acrylamide.

17. A method for minimizing fluid loss when drilling a well comprising:
    (a) adding to a water based drilling fluid a drilling fluid additive comprising
        (i) about 0.25 to about 10 lbs. per barrel of a hydroxyalkyl cellulose or an alkyl ether substituted cellulose; and
        (ii) about 0.25 to about 10 lbs. per barrel of a synthetic sulfonate-containing vinyl polymer having a molecular weight range of about 300,000 to about 10 million wherein the weight ratio of component (i) to (ii) is about 10:1 to about 1:1;
    (b) circulating the drilling fluid from a well while drilling at a temperature up to about 300° F. thereby substantially reducing filter loss from said fluid via said additive as expected from said synthetic sulfonate-containing vinyl polymer alone.

18. The method as recited in claim 17 where said cellulose comprises a polyanionic cellulose or carboxymethyl cellulose.

19. The method as recited in claim 17 where in step (a) ((ii) said synthetic polymer comprises a vinyl polymer or copolymer in which one of the components is based on a sulfonic acid monomer or where the sulfonate is derived by sulfonating an existing vinyl polymer or copolymer.

20. The method as recited in claim 17 where in step (a) (ii) said synthetic polymer comprises a vinyl polymer or copolymer in which one of the components is based on a sulfonic acid monomer which is selected from a member of the group consisting of ethylenesulfonic acid, propenesulfonic acid, methylpropenesulfonic acid, styrenesulfonic acid, vinyltoluenesulfonic acid, sulfoethyl methacrylate; 2-acrylamido-2-methylpropanesulfonic acid, and mixtures thereof.

21. The method as recited in claim 17 where in step (a) (ii) said sulfonate polymer is obtained by sulfonating polystyrene or a styrene copolymer.

22. The method as recited in claim 17 where in step (a) (i) said cellulose comprises about 5 ppb of polyanionic cellulose which is combined with about 1.5 ppb of a sulfonate polymer containing 2-acrylamido-2-methylpropanesulfonic acid and N-methyl-N-vinylacetamide.

23. The method as recited in claim 17 where in (a) (i) said cellulose comprises about 5 ppb of polyanionic cellulose which is combined with about 1.5 ppb of a sulfonate polymer containing 2-acrylamido-2-methylpropanesulfonic acid, N-methyl-N-vinylacetamide and acrylamide.

24. The method as recited in claim 17 where in step (a) (i) said cellulose comprises about 5 ppb of polyanionic cellulose which is combined with about 1.5 ppb of a sulfonate polymer containing 2-acrylamido-2-methylpropanesulfonic acid and acrylamide.

25. The method as recited in claim 17 where said drilling fluid contains a concentrated brine.

* * * * *

UNITED STATES PATENT AND TRADEMARK OFFICE
CERTIFICATE OF CORRECTION

PATENT NO. : 5,008,025

DATED : April 16, 1991

INVENTOR(S) : John Hen et al.

It is certified that error appears in the above-identified patent and that said Letters Patent is hereby corrected as shown below:

Title page; item (75) Inventors should read:
"Inventors: John Hen, Skillman, N.J., and
Rita A. Read, Lambertville, N.J."

Signed and Sealed this

Fifteenth Day of September, 1992

Attest:

DOUGLAS B. COMER

*Attesting Officer*      Acting Commissioner of Patents and Trademarks